UNITED STATES PATENT OFFICE.

ERNST LAVES, OF HANOVER, GERMANY.

SOLUBLE-IRON-ALBUMINATE PREPARATION.

No. 929,452.

Specification of Letters Patent.

Patented July 27, 1909.

Application filed May 14, 1906. Serial No. 316,824.

*To all whom it may concern:*

Be it known that I, ERNST LAVES, chemist, subject of the Emperor of Germany, and resident of Militänstrasse, Hanover, Germany, have invented new and useful Improvements in and Relating to Soluble-Iron-Albuminate Preparations, of which the following is a specification.

This invention relates to a recipe for preparing easily soluble iron albuminate and iron albuminate solutions which will retain their perfect integrity.

In the first instance iron albuminate is prepared in the already known way, from solution containing combined iron oxid, for instance 30 kilograms either of solution of oxichlorid of iron, or solution of dialyzed iron, which are two solutions of basic ferric chlorid containing about 5% of ferric oxid, which is mixed (at 50° centigrade) with 200 liters of water with carbonate of potassium 3 to 5 grams of alkali to 1 kilogram of oxychlorid of iron, and mixed with a solution of 8 kilograms of dry albumen dissolved in 200 liters of water at 50° centigrade. The albumen may be obtained from the white of eggs, blood albumen, or vegetable albumen.

By the use of the stated quantities of material as aforementioned, about 18 pounds of iron albuminate are formed. This is mixed in a dry or damp state with 6 kilograms of saccharated oxid of iron (a mixture of fresh iron hydroxyd with sugar may be used instead of the latter,) and 300 grams of carbonate of potassium. By means of this addition the qualities of the iron albuminate are changed considerably namely: the albuminate has become more easily soluble, *i. e.* the alkali addition necessary for the dissolving can, in proportion to the addition be decreased or dispensed with.

Iron albuminate solutions obtained by means of saccharated oxid of iron in water and spirits of wine are durable, which is not the case with the analogue of simple albuminate solutions; the latter generally gelatinize after being kept a short time.

The solutions of iron albuminate obtained by alkali have an alkaline taste and color litmus blue; if the solution is obtained with iron saccharate, it is not alkaline and has no taste.

In order to dissolve iron albuminate, according to the prescription of the *Deutsche Arzneibuch* to make liquor ferri albuminate, a slightly dull liquid seen in a reflected light, one adds approximately 15 parts of sodium-hydroxyd to 100 parts of iron of the albuminate; according to the prescription of the *Pharmakopoea Helvetica* even approximately 27 parts of sodiumhydroxyd; according to the direction of Dietrich, Helfenberg, 45 parts of sodiumhydroxyd when using dry iron albuminate for the purpose of obtaining a clear solution.

By adding saccharated oxid of iron to the freshly prepared iron albuminate, prepared in accordance to the *Deutsche Arzneibuch*, one obtains clear solutions by the addition of 10 or 5 or 1 parts respectively of sodium-hydroxid to 100 parts of iron of the albuminate in the presence of 50, 100 or 150 parts respectively of iron of the saccharated oxid of iron.

The taste of iron in iron albuminate saccharated oxid of iron solutions is still less than in iron albuminate solutions.

Having fully described my invention, what I claim and desire to secure by Letters Patent is:

The process of making the hereinbefore described preparation forming stable aqueous solutions and containing a chemical compound of iron with albumen consisting in forming a compound of iron with albumen by mixing together 30 kilograms of solution of basic ferric chlorid containing about 5% of ferric oxid with 200 liters of water, the specified quantity of alkali, and a solution of 8 kilograms of albumen in 200 liters of water and then mixing with the resultant quantity of iron albuminate 6 kilograms of saccharated oxid of iron and 300 grams of alkali, substantially as described.

In testimony whereof I have hereunto set my name in the presence of two subscribing witnesses.

ERNST LAVES.

Witnesses:
 HENRY J. FULLER,
 ANNA DIPPEL.